United States Patent
Seto et al.

[19]

[11] Patent Number: 6,125,959
[45] Date of Patent: *Oct. 3, 2000

[54] MANPOWER-ASSISTING POWER APPARATUS

[75] Inventors: Takeshi Seto; Hiroshi Miyazawa, both of Suwa, Japan

[73] Assignee: Seiko Epson Corporation, Tokyo, Japan

[*] Notice: This patent is subject to a terminal disclaimer.

[21] Appl. No.: 09/116,672

[22] Filed: Jul. 16, 1998

Related U.S. Application Data

[63] Continuation of application No. 08/604,270, Feb. 21, 1996, Pat. No. 5,836,414.

[30] Foreign Application Priority Data

Feb. 21, 1995 [JP] Japan ..................................... 7-32708
Jan. 10, 1996 [JP] Japan ..................................... 8-002694

[51] Int. Cl.[7] ................................................. B62K 11/00
[52] U.S. Cl. ................................................ 180/207; 280/212
[58] Field of Search ................................ 180/205, 206, 180/207, 220; 280/212

[56] References Cited

U.S. PATENT DOCUMENTS

| | | |
|---|---|---|
| 4,364,448 | 12/1982 | Ikuma . |
| 5,024,286 | 6/1991 | Lean et al. . |
| 5,370,200 | 12/1994 | Takata . |
| 5,474,148 | 12/1995 | Takata ..................................... 180/206 |

FOREIGN PATENT DOCUMENTS

| | | |
|---|---|---|
| 56-76590 | 6/1981 | Japan . |
| 2-391 | 1/1990 | Japan . |
| 5-500347 | 1/1993 | Japan . |

*Primary Examiner*—Donald W. Underwood

[57] ABSTRACT

A manpower-assisting power apparatus for appropriately applying power to assist human power without using a large, high cost torque detection apparatus, and enabling operation by human power to be continued even when external motor-generated power is no longer applied. This manpower-assisting power apparatus is equipped with a differential gear mechanism preferably comprising a pedal drive bevel gear, a motor drive bevel gear, and a pair of corresponding small bevel gears driving a rotary output member. The rotational speeds of the motor drive spur gear integrated with motor drive bevel gear, and pedal drive sprocket integrated with pedal drive bevel gear are respectively detected by a motor speed sensor and at least one manpower rotational speed sensors operating in a noncontact fashion. These detected rotational speeds are used by a controller to preferably drive the motor to maintain a constant ratio between these rotational speeds. Also, this power apparatus may employ a planetary gear system to minimize mechanical loss when transferring power from the motor-manpower combination to the output member driving a wheel.

12 Claims, 7 Drawing Sheets

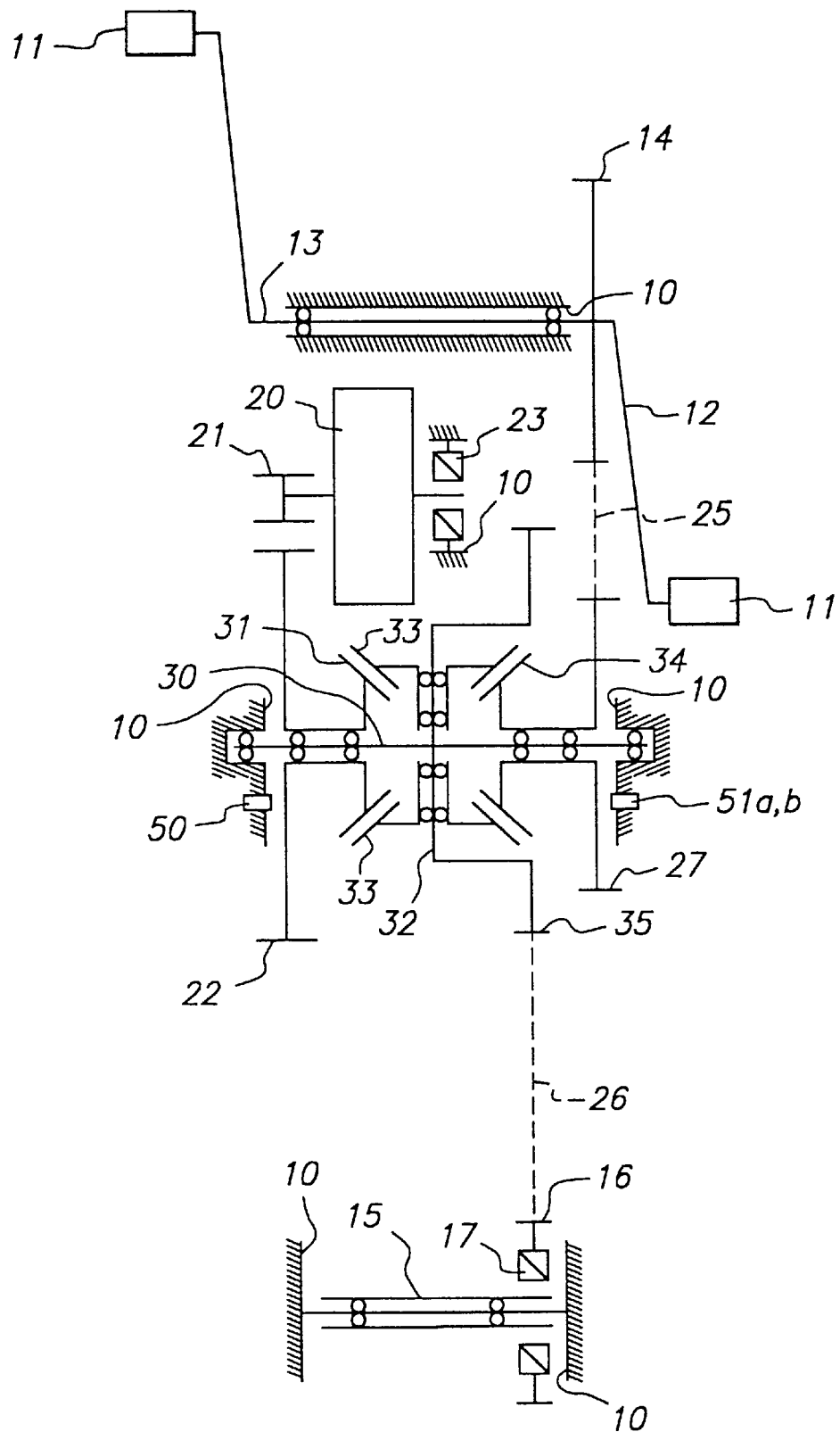
FIG_1

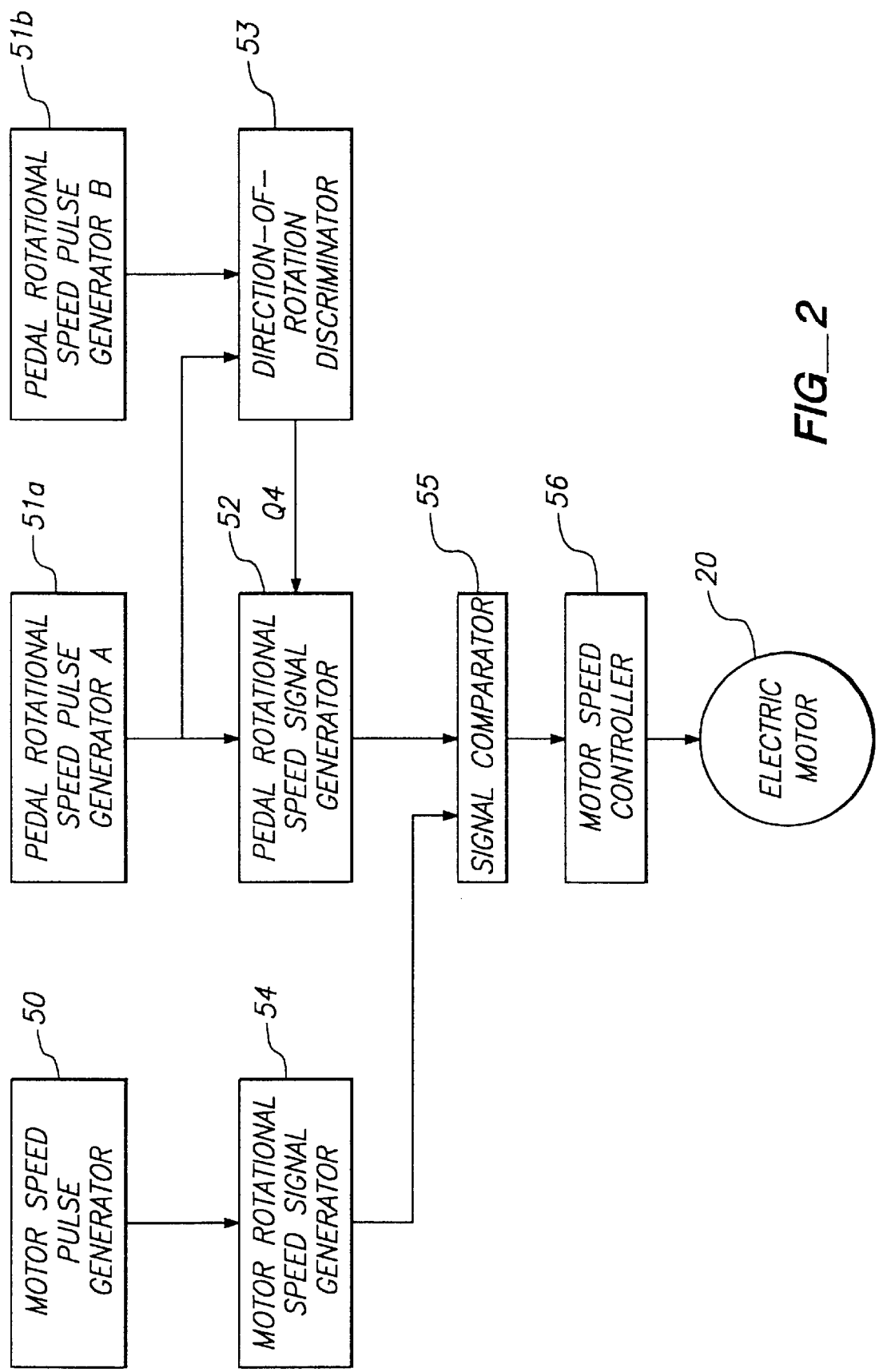
FIG_2

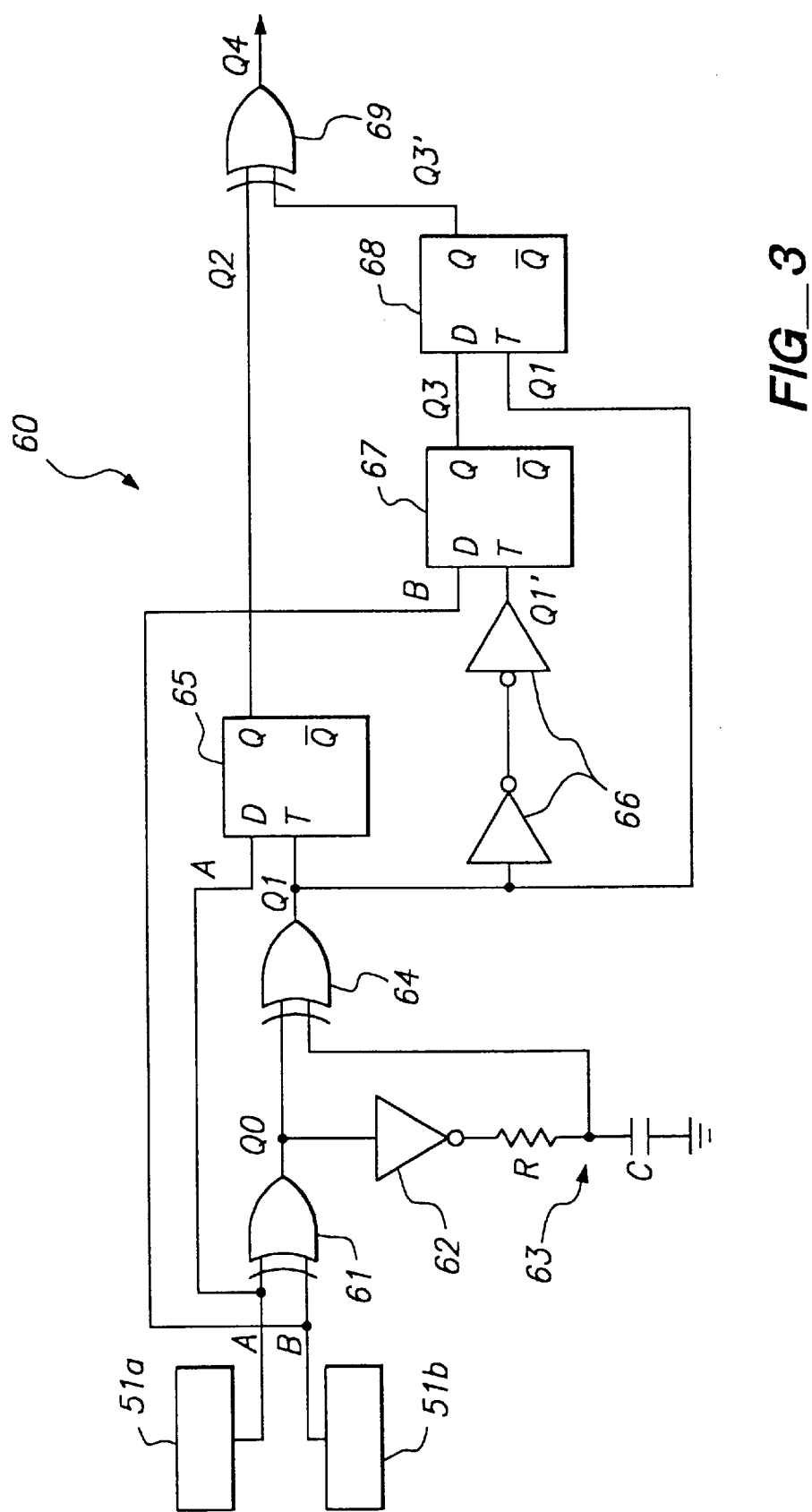
FIG_3

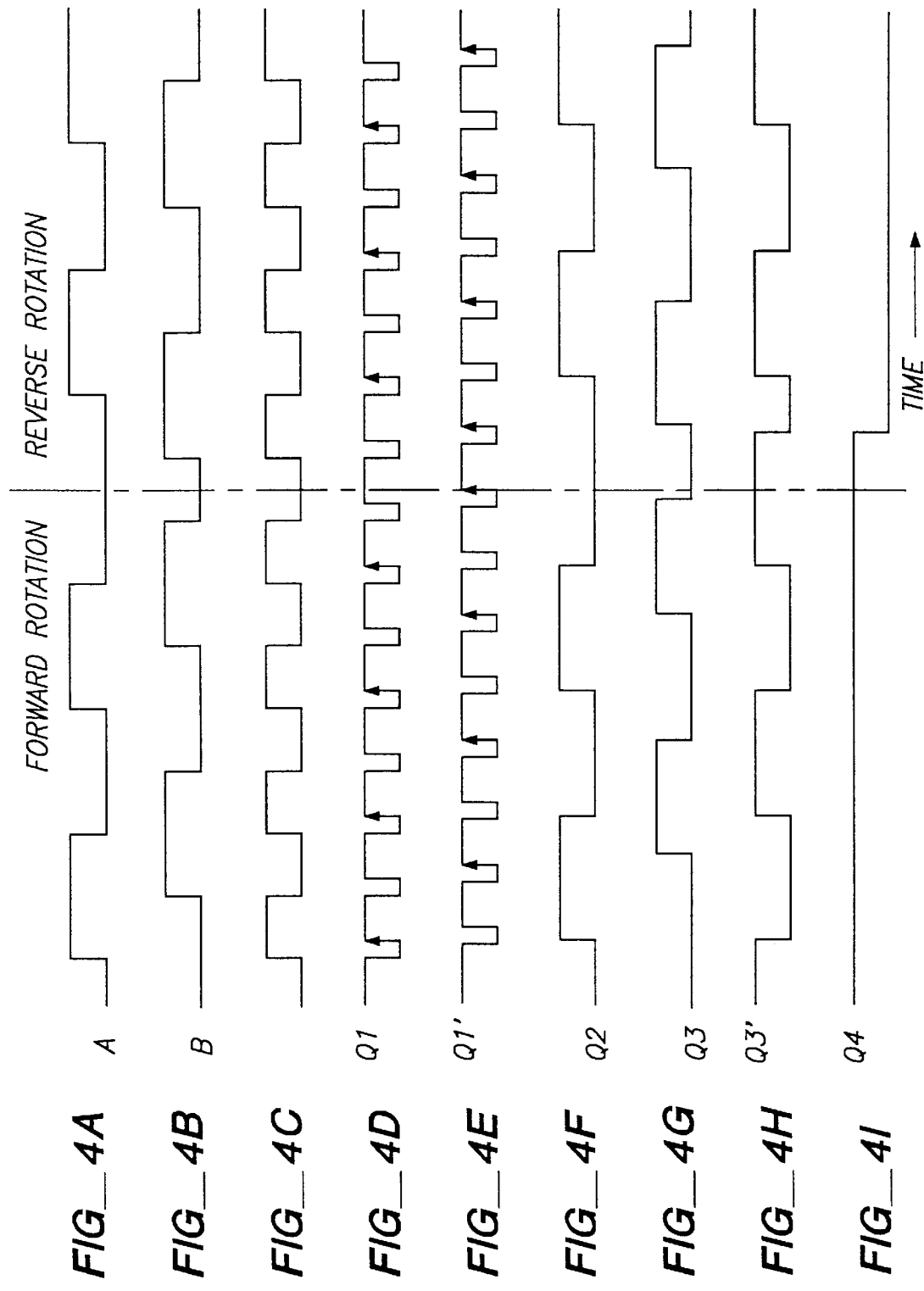

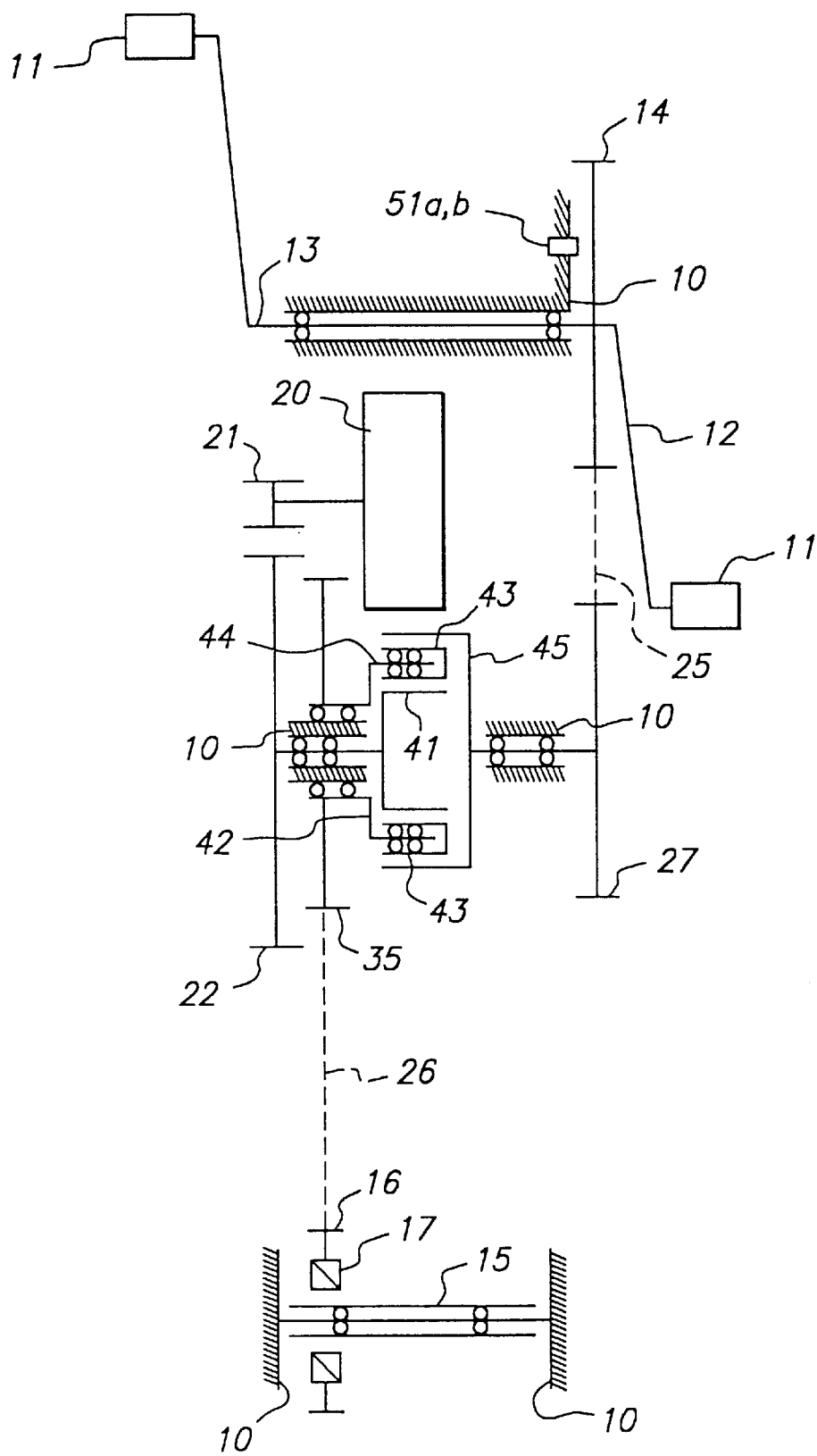
FIG_5

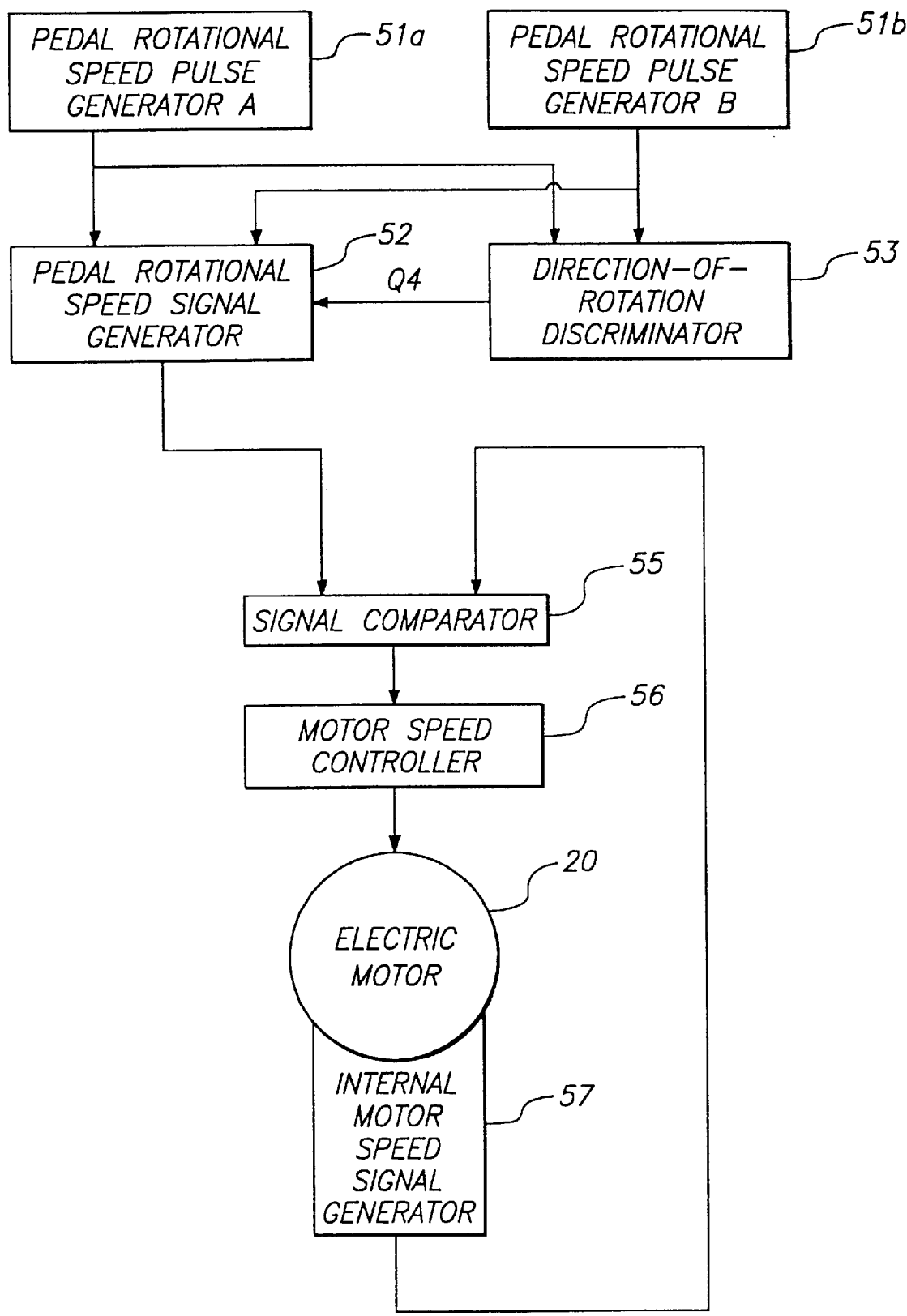
FIG__6

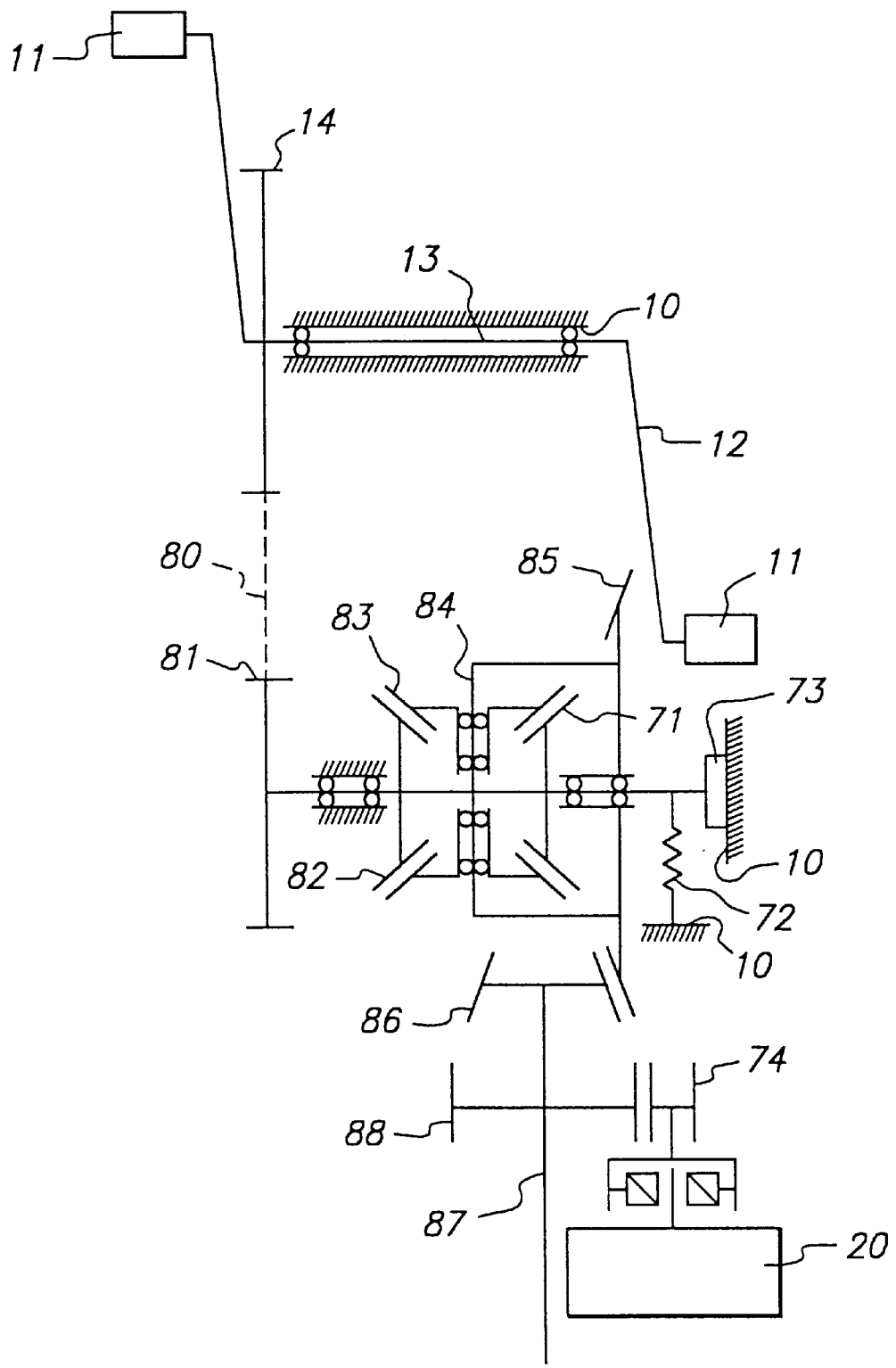
FIG_7 PRIOR ART

MANPOWER-ASSISTING POWER APPARATUS

This is a continuation of prior application Ser. No. 08/604,270, filed on Feb. 21, 1996, now U.S. Pat. No. 5,836,414, issued on Nov. 17, 1998, the contents of which are incorporated herein by reference.

BACKGROUND OF THE INVENTION

1. Field of the Invention

The present invention relates to improvements in manpower-assisting power devices suitable for application with, for example, a bicycle equipped with an assisting electric motor.

2. Description of the Related Art

Manpower-assisting power devices combining manpower rotation and rotation driven by an electric motor or other external source by means of a differential gear mechanism are described in Japanese patent tokkai S55-31644 (1980-31644), Japanese utility model jikko H2-391 (1990-391), and Japanese patent tokkai H5-319354 (1993-319354). The mechanism described in Japanese utility model jikko H2-391 (1990-391), for example, combines manpower with the power of an electric motor to enable faster travel than when utilizing the electric motor alone.

A manpower-assisting power apparatus including a mechanism for detecting any applied manpower-generated torque, and applying electric motor torque according to this detected manpower has also been proposed in Japanese tokkai S56-76590 (1981-76590). FIG. 7 shows the configuration of the manpower-assisting power apparatus based on Japanese tokkai S56-76590 (1981-76590).

The manpower-assisting power apparatus shown in FIG. 7 has a differential gear mechanism comprising pedal drive bevel gear 82, detection bevel gear 71, and a pair of small bevel gears 83 engaging these gears 82 and 71. Manpower rotation applied to pedal drive bevel gear 82 by means of pedal axle sprocket 14, chain 80, and pedal drive sprocket 81 is transferred to output bevel gear 85 by the revolution of small bevel gears 83 supported in a free rotating manner on small bevel gear rotation axle 84, and then through bevel gear 86 to axle 87.

Rotation of pedal drive bevel gear 82 and the opposing detection bevel gear 71 is hindered by spring 72. Pedal drive bevel gear 82 and detection bevel gear 71 thus rotate an angle proportional to the reaction force received from small bevel gears 83, and the amount of rotation is detected by potentiometer 73.

Small gear 74 is fixed to the rotational axis of electric motor 20, and engages gear 88 fixed to axle 87. Electric motor 20 generates torque according to the amount of rotation detected by potentiometer 73. As a result, power complementary to the manpower and generated by electric motor 20 is thus added to axle 87.

However, conventional manpower-assisting power apparatus combining, by means of a differential gear mechanism, rotation produced by manpower and rotation produced by the power of an electric motor or other external source, as described hereinabove with reference to FIG. 7, only has the effect of a simple power combiner or transmission apparatus, and is not able to provide power assistance proportional to the experienced manpower. To further illustrate this shortcoming, consider an electric motor-equipped bicycle employing a conventional manpower-assisting apparatus. In this case, the rider must perform two separate actions, 1) turning the pedals with the feet; and 2) controlling operation of the electric motor with, e.g., an awkward lever provided on the handlebar in a substantially simultaneous manner. As a result, operation is complicated and power assistance is delivered with no relationship to the force pushing the pedals. Further, operating errors can occur easily with the lack of natural feedback to the rider, thus making safe operation difficult, if not impossible. In effect, the rider is distracted from the road and his changing environment by control of the power assisting motor. Moreover, it is legally difficult in many countries, including Japan, for conventional self-propelled capable bicycles (utilizing, e.g. an electric motor) to be considered merely a bicycle in which a driver's license or permit is not required.

A possible solution has been proposed by implementing a manpower torque driving mechanism responsive to human applied pressure to the pedals. This results in a power system which incrementally increases or decreases the torque of the electric motor according to the detected human originated torque being applied to the pedals. And, it offers a simple, intuitive human interface for controlling the motor with improved feedback, and so-equipped vehicles and other devices can be operated easily without requiring fine motive power control as in a motor vehicle. However, when the manpower torque detection precision is not sufficient and output linearity is poor, not only does the sense of control feel unnatural, but dangerously rapid acceleration unintended by the rider may occur. In addition, sufficient power assistance may not be achieved when it is necessary to avoid danger. Therefore, a high precision torque detection apparatus is required for this type of electric motor-equipped bicycle, but high precision torque detection apparatuses are heavy, cumbersome and expensive.

Furthermore, when the battery or other energy source is depleted and power assistance cannot be obtained because of the torque detection mechanism, the pedals become more difficult to turn. This is a significant problem making riding the bicycle difficult or impossible for the most common users of electric motor-equipped bicycles, including people with low physical strength and people who frequently travel on hilly roads.

OBJECT OF THE INVENTION

Therefore, an object of the present invention is to provide a manpower-assisting power apparatus for appropriately applying power to assist man-made power without using a high cost, large torque detection apparatus, and enabling operation by manpower to be continued even when power assistance is no longer applied.

SUMMARY OF THE INVENTION

In accordance with this and related objects, a manpower-assisting power apparatus according to the present invention may preferably comprise: a differential gear mechanism operating with manpower rotation and electric motor rotation inputs; a rotational speed detection mechanism for directly or indirectly detecting the speed of the manpower rotation and electric motor rotation; a signal comparator for comparing the signals detected by the rotational speed detection mechanism; and a controller for controlling the speed of the electric motor so that the ratio of the manpower rotation and electric motor rotation speeds compared by the signal comparator is constant. Accordingly, when the revolution of the gears forming the differential gear mechanism is used as the drive rotation of the wheels, the rotation of the gears is suppressed as much as possible.

The manpower-assisting power apparatus thus comprised detects the speed of both manpower rotation and electric motor rotation to control the auxiliary power with good precision. When the auxiliary power is not working, travel can be continued with no change in the manpower torque load and the output rotation speed simply slowing.

In addition, the manpower-assisting power apparatus of the present invention preferably further comprises a reverse rotation prevention mechanism for preventing reverse rotation of the electric motor. Furthermore, the detent torque of the electric motor in the manpower-assisting power apparatus of the present invention is preferably greater than the reaction force applied to the electric motor during normal use. By means of such configuration, the electric motor is prevented from rotating in reverse due to the reaction force of the manpower when the auxiliary power is not working, thereby enabling manpower to be effectively utilized and preventing potentially dangerous misoperation.

The electric motor of the manpower-assisting power apparatus of the present invention is furthermore preferably a brushless motor. A brushless motor is inherently able to detect its internal motor speed (through the motor drive control circuit), offers high efficiency, and is suited to driving manpower-assisting power apparatuses for which the battery size cannot be very large. Brushless motors also offer outstanding durability, and can weather environmental and ambient extremes relatively well.

The rotational speed detection mechanism further preferably comprises a sensor for non-contact detection of the rotational speed. This improves rotational speed detection precision, and offers outstanding durability.

The manpower-assisting power apparatus of the present invention preferably further comprises a direction-of-rotation detection mechanism for detecting the direction of manpower rotation. The operation or non-operation of the auxiliary power of the electric motor can be controlled based on the rotational direction of the manpower rotation detected by the direction-of-rotation detection mechanism. When the rotational direction of the manpower rotation corresponds to the reverse rotation of the pedals on an electric motor-equipped bicycle, the electric motor is controlled to not operate irrespective of the manpower rotational speed. This prevents unintentional acceleration, and enables safe operation.

It is also preferable that the direction-of-rotation detection mechanism uses at least part of the components thereof, such as the sensor, in common with the rotational speed detection mechanism. This reduces the number of parts, and helps simplify the construction of the apparatus.

Furthermore, the differential gear mechanism of the manpower-assisting power apparatus according to the present invention preferably does not share an axle with either the primary manpower input axle corresponding to the pedal axle, or the final output axle corresponding to the rear wheel, of an electric motor-equipped bicycle. By thus independently providing the axle for the essential component (differential gear mechanism) of the manpower-assisting power apparatus, a slim-line manpower-assisting power apparatus that does not interfere with the rider's body can be constructed for an electric motor-equipped bicycle.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts:

FIG. 1 is a block diagram showing the preferred embodiment of a manpower-assisting power apparatus according to the present invention;

FIG. 2 is a control block diagram of the embodiment shown in FIG. 1;

FIG. 3 is a circuit diagram showing the configuration of the direction-of-rotation detection circuit;

FIG. 4 is a timing chart showing the operation of the direction-of-rotation detection circuit;

FIG. 5 is a block diagram showing an alternative embodiment of a manpower-assisting power apparatus according to the present invention;

FIG. 6 is a control block diagram of the embodiment shown in FIG. 5; and

FIG. 7 is a block diagram of a conventional manpower-assisting power apparatus.

DESCRIPTION OF THE PREFERRED AND ALTERNATIVE EMBODIMENTS

The manpower-assisting power apparatus according to the present invention is described hereinbelow in conjunction with preferred and alternative embodiments referencing the accompanying figures.

Turning to the figures, FIG. 1 and FIG. 2 are configuration and control block diagrams, respectively, of the presently preferred embodiment of a manpower-assisting power apparatus according to the present invention as applied to an electric motor-equipped bicycle.

Referring specifically to FIG. 1, pedals 11, cranks 12, pedal axle 13, and pedal axle sprocket 14 rotate on a mutually fixed pedal axis identically to a common bicycle. Rotation of pedal axle sprocket 14 is transferred to pedal drive sprocket 27 by a first chain 25.

Electric motor 20 is, for example, a DC motor. Note, as will be described in a further embodiment below, electric motor 20 may also constitute a brushless motor, especially in limited power reserve applications.

Motor shaft gear 21 is fastened to one end (the left end in FIG. 1) of the output shaft projecting to both sides of electric motor 20, and engages with motor drive spur gear 22. The other end (the right end in FIG. 1) of the output shaft of electric motor 20 engages a reverse rotation prevention mechanism, i.e., one-way motor shaft clutch 23 fixed to frame 10, permitting the output shaft of electric motor 20 to turn in only one direction.

Intermediate shaft 30 is supported by bearings on frame 10, and small bevel gear rotation shaft 32 is fastened perpendicularly to intermediate shaft 30. Output sprocket 35 is fastened coaxially to intermediate shaft 30 on the end of small bevel gear rotation shaft 32.

Pedal drive sprocket 27 and pedal drive bevel gear 34 are fastened together and supported coaxially to intermediate shaft 30 by a bearing permitting pedal drive sprocket 27 and pedal drive bevel gear 34 to rotate freely. Motor drive bevel gear 31 and motor drive spur gear 22 are likewise fastened together and supported in a freely rotating manner on intermediate shaft 30.

Pedal drive bevel gear 34 and motor drive bevel gear 31 engage a pair of small bevel gears 33, thus forming a differential gear mechanism that operates using both manpower rotation and electric motor rotation as inputs.

Both small bevel gears 33 are capable of rotation and revolution. Revolution of small bevel gears 33 is converted to rotation of output sprocket 35 via small bevel gear rotation shaft 32. Note that the number of teeth and the tooth pitch of pedal drive bevel gear 34 and motor drive bevel gear 31 are equal.

Rotation of output sprocket 35 is transferred via second chain 26 to rear wheel sprocket 16 to rotationally drive rear wheel axle 15 by means of one-way clutch 17, which transfers only rotational torque in the forward direction similarly to a conventional bicycle.

A rotational speed detection mechanism for directly or indirectly detecting the rotational speed of manpower rotation and of electric motor rotation is also provided herein. This rotational speed detection mechanism comprises pedal rotational speed pulse generators 51a and 51b, and motor speed pulse generator 50, each having a sensor capable of detecting the rotational speed without making contact.

A magnetic sensor, or transmittance-type (photointerrupter) or reflective-type (photoreflector) optical sensor, for example, may be conveniently used for these sensors. The sensor part of pedal rotational speed pulse generators 51a and 51b, and motor speed pulse generator 50, is fastened to frame 10 in positions opposing the side of pedal drive sprocket 27 and motor drive spur gear 22, respectively.

When optical sensors are utilized, through-holes or recesses are provided at an equal pitch circumferentially to, and preferably concentrically to, pedal drive sprocket 27 and motor drive spur gear 22 on the sides thereof in a position opposite said sensors. Then, pulse generators 51a, 51b, and 50 generate and receive light pulses based on the rotational movement of these through-holes or recesses.

Note that in this embodiment there are two pedal rotational speed pulse generators 51a and 51b (or two sensors), each generating two pulse streams at a 90° phase difference while pedal drive sprocket 27 is turning.

The operation of the manpower-assisting power apparatus of the preferred embodiment is described next with reference to FIGS. 1 and 2.

When the operator pushes pedals 11 and rotates pedal axle 13, pedal drive sprocket 27 and pedal drive bevel gear 34 turn. As a result, pedal rotational speed pulse generators 51a and 51b generate two pulse streams with a 90° phase difference. Of these two pulse streams, one is input to pedal rotational speed signal generator 52, where it is converted to a pedal rotational speed signal. Preferably, this pedal rotational speed signal comprises an analog voltage output generated by the frequency-proportional voltage generator (not shown) within the pedal rotational speed signal generator 52.

Meanwhile, rotation of electric motor 20, which generates the auxiliary power, is detected by motor speed pulse generator 50. In turn, the pulse stream generated by this pulse generator 50 is input to motor rotational speed signal generator 54, which voltage-converts the pulse stream to the motor rotational speed signal in a manner similar to that developed for the manpower-derived pedal rotation speed discussed hereinabove.

The pedal rotational speed signal and motor rotational speed signal are input to signal comparator 55. Signal comparator 55 compares the rotational speeds of the pedals and electric motor, and outputs a command signal according to the comparison result to motor speed controller 56. Motor speed controller 56 controls the speed of electric motor 20 according to this command signal to maintain a constant speed ratio (e.g., 1:1) between the manpower rotation and electric motor rotation.

Note that because motor drive bevel gear 31 and pedal drive bevel gear 34 have the same number of teeth in the configuration of the present embodiment, the relationship $X+Y=2Z$ may be derived, where: X is the rotational speed of pedal drive bevel gear 34 and pedal drive sprocket 27 forming the differential gear mechanism; Y is the rotational speed of motor drive bevel gear 31 and motor drive spur gear 22, and Z is the revolutional speed of small bevel gears 33 and the rotational speed of the output sprocket 35.

Regarding torque, torque equivalent to that of pedal drive bevel gear 34 is also continually generated at motor drive bevel gear 31 because small bevel gears 33 are supported by a bearing to small bevel gear rotation shaft 32 in a manner enabling free rotation.

Auxiliary power proportional to the manpower can therefore be obtained by applying control to maintain a constant ratio between X, which is the rotational speed of pedal drive sprocket 27, and Y, which is the rotational speed of motor drive spur gear 22. Note that this ratio between X and Y can be set or changed as desired by, for example, setting the gain of signal comparator 55 or by changing the control program of motor speed controller 56 in a well-known manner, and the ratio of auxiliary power to manpower can be freely set according to particular application requirements purpose.

As this embodiment demonstrates, power assistance proportional to the manpower is thus possible by using only a rotational speed signal, which can be easily detected with better precision than torque force. Accordingly, the manpower-assisting power apparatus of the preferred embodiment exhibits little variation in the ratio of auxiliary power to manpower.

Furthermore, when motor speed controller 56 applies appropriate control signals to maintain an X:Y ratio of 1:1, (i.e., to suppress as much as possible rotation of small bevel gears 33 around small bevel gear rotation shaft 32), loss from meshing of small bevel gears 33 disappears, and manpower and electric motor power are combined without mechanical loss. This represents a major advantage for a manpower-assisting power apparatus requiring high efficiency due to the small power level handled. The manpower-generated power (e.g. pedal power) and the electric motor-generated power are consistently equal at this time due to matching of both rotational speed and torque in the differential gear mechanism, and 1:1 power assistance is thus made possible.

It is to be noted that pedal drive bevel gear 34 and motor drive bevel gear 31 may have different numbers of teeth. This makes it possible to change the torque ratio during power combining. Also, selected teeth ratios can suppress rotation of small bevel gears 33 as much as possible, even at power assistance ratios other than 1:1, and can still operate to reduce mechanically-originated power loss.

Comparison to a conventional, unassisted bicycle and an electric motor-equipped bicycle according to the present embodiment is deemed appropriate herein. Assuming that the number of teeth on the sprockets, etc., are set so that the ratio between the pedal speed and bicycle speed is the same on both bicycles, if the bicycle pedals are turned at the same speed, both bicycles will travel at the same speed. However, on the electric motor-equipped bicycle according to the present embodiment, small bevel gear rotation shaft 32 and output sprocket 35 are driven by the torque from both the manpower-driven pedal drive bevel gear 34 and motor drive bevel gear 31. Consequently, the leg power driving pedals 11 is therefore less than in a conventional bicycle (e.g., approximately half), resulting in a bicycle that travels easily, particularly uphill, and imposes a small load on, for example, elderly riders.

The configuration of the direction-of-rotation detector of the presently preferred embodiment is described next. The direction-of-rotation detector comprises pedal rotational speed pulse generators 51a and 51b (also used above in connection with the pedal rotational speed mechanism 52), and direction-of-rotation discriminator 53. Direction-of-rotation discriminator 53 preferably includes an internal direction-of-rotation detection circuit 60, described in more detail with reference to FIGS. 3 and 4 hereinbelow. Specifically, FIG. 3 is a circuit diagram showing an example of the configuration of direction-of-rotation detection circuit 60, and FIG. 4 is a timing chart illustrating the operation of direction-of-rotation detection circuit 60.

Turning to FIG. 3, pulse signals A and B having a 90° phase difference are output from pedal rotational speed pulse generators 51a and 51b, respectively, according to the rotation of the manpower-driven pedal drive sprocket 27. Signals A and B are input to EXOR gate 61, obtaining signal $Q_0$. Signal $Q_0$ is input to one of the input terminals of EXOR gate 64. Signal $Q_0$ is also input through inverter 62 and delay circuit 63 to the other input terminal of EXOR gate 64, and timing pulse $Q_1$ is generated by EXOR gate 64. Timing pulse $Q_1$ also passes through inverters 66, generating timing pulse $Q_1'$ delayed from timing pulse $Q_1$ by the combined gate delay of both inverters 66.

Signal A is also input to D type flip-flop 65, and timing pulse $Q_1$ is input as the clock pulse to D type flip-flop 65.

Signal B is also input to D type flip-flop 67, and timing pulse $Q_1'$ is input as the clock pulse to D flip-flop 67.

Signal $Q_2$ is obtained from the noninverting output of D type flip-flop 65, and signal $Q_2$ is input to one of the input terminals of EXOR gate 69.

Signal $Q_3$ is obtained from the noninverting output of D type flip-flop 67, and is routed to the input of D type flip-flop 68. Timing pulse $Q_1$ is also input as the clock pulse to D type flip-flop 68.

Signal $Q_3'$ output from the noninverting lead of D type flip-flop 68 is input to the other input terminal of EXOR gate 69. Direction-of-rotation detection signal $Q_4$ is output from EXOR gate 69.

As shown in the timing chart of FIG. 4, when the manpower rotation is forward rotation, i.e., when the rotation of pedal axle 13 is rotation in the direction causing the electric motor-equipped bicycle to travel forward, direction-of-rotation detection signal $Q_4$ is a HIGH level (ON) signal; when the manpower rotation is reverse rotation, direction-of-rotation detection signal $Q_4$ is a LOW level (OFF) signal. When the manpower rotation changes from forward rotation to reverse rotation, or from reverse rotation to forward rotation, direction-of-rotation detection signal $Q_4$ transitions (inverts) accordingly.

Direction-of-rotation detection signal $Q_4$ from the direction-of-rotation discriminator 53 is input to pedal rotational speed signal generator 52.

When direction-of-rotation detection signal $Q_4$ is a HIGH level signal, (i.e., when the manpower rotation is forward rotation), pedal rotational speed signal generator 52 converts the pulse signal from pedal rotational speed pulse generator 51a to a pedal rotational speed signal. Thus, when the manpower rotation is reverse rotation, the pedal rotational speed signal is not output, and electric motor 20 is not driven. As a result, a safe manpower-assisting power apparatus with no energy loss can be constructed.

It is to be noted that the direction-of-rotation detection means for manpower rotation shall not be limited in the present invention to means configured as described above, and any means that can detect the direction of manpower rotation may be used in order to achieve the desired functionality.

Also, the manpower-assisting power apparatus of the presently preferred embodiment comprises a one-way motor shaft clutch 23 (FIG. 1) which serves as a reverse rotation prevention mechanism for electric motor 20. As a result, reverse rotation of electric motor 20 is prevented even when the reaction force acting on electric motor 20 due to strong pressure on pedals 11 exceeds the output torque limit of electric motor 20. Thus, all applied manpower can be effectively utilized to propel the electric motor-equipped bicycle. Even if motor speed controller 56 attempts to drive electric motor 20 in this case, the motor speed signal is not generated, and control that does not waste electrical energy is possible by stopping electric motor 20 drive.

The following effects can also be achieved by combining the reverse rotation prevention mechanism of electric motor 20 and the differential gear mechanism according to the preferred embodiment. Because the capacity of the battery serving as the electric motor 20 energy source is limited, the manpower-assisting power apparatus of an electric motor-equipped bicycle ceases to provide power assistance while traveling when the battery is completely discharged (depleted). When auxiliary power cannot be obtained in an electric motor-equipped bicycle according to Japanese patent tokkai S56-76590 (1981-76590) described as an example of the prior art, the leg power required to push the pedals of a heavy electric motor-equipped bicycle becomes conversely greater than that of a conventional bicycle, and travel uphill, for example, becomes difficult, if not impossible for the rider.

When electric motor 20 does not operate in an electric motor-equipped bicycle according to the present embodiment, however, motor drive bevel gear 31 is held stationary by one-way motor shaft clutch 23 and the reaction force of pedal drive, and the rotation of pedal drive bevel gear 34 is transferred to output sprocket 35 at twice the torque and ½ the speed by the rotation and revolution of small bevel gears 33. Therefore, while the speed of the electric motor-equipped bicycle slows relative to the rotational speed of the pedal axle, the required leg power is held low, irrespective of the presence of any auxiliary power, when compared with a conventional bicycle not equipped with a manpower-assisting power apparatus, and even uphill travel is easy.

In addition, because the differential gear mechanism has an independent axle and does not share an axle with either pedal axle 13 or rear wheel axle 15, the thickness (the horizontal length in FIG. 1) of the mechanical assembly can be made thin, and because there is a great degree of freedom in mechanical assembly placement, a slim-line electric motor-equipped bicycle that does not interfere with the rider's body can be achieved.

FIG. 5 and FIG. 6 are configuration and control block diagrams, respectively, of an alternative embodiment of a manpower-assisting power apparatus according to the present invention applied to an electric motor-equipped bicycle. The manpower-assisting power apparatus of the present embodiment is described below based on these figures, omitting as necessary further description of items that are the same as in the first embodiment above.

Referring to FIG. 5, rotation of pedal axle 13 from pushing on pedals 11 is transferred via pedal axle sprocket 14, first chain 25, and pedal drive sprocket 27 to internal gear 45, which is fastened to pedal drive sprocket 27 and axially supported on frame 10. Pedal rotational speed pulse generators 51a and 51b detecting the speed and direction of manpower rotation are disposed to frame 10 opposing the side of pedal axle sprocket 14.

The rotation of electric motor 20 is transferred via motor shaft gear 21 and motor drive spur gear 22 to sun gear 41, which is fastened to motor drive spur gear 22 and axially supported on frame 10. On the end of carrier 42 is provided a pair of planetary gear rotation shafts 44, for example, and planetary gear 43 is supported in a free-turning manner on each planetary gear rotation shaft 44. Each planetary gear 43 engages internal gear 45 and sun gear 41.

Output sprocket 35 is fastened to carrier 42, and these are supported by a bearing on frame 10 in a free-turning manner. A differential gear mechanism wherein manpower rotation is input to internal gear 45, electric motor rotation is input to sun gear 41, and output rotation is obtained from carrier 42, is thus comprised by this configuration.

Electric motor 20 in this embodiment is a brushless motor, and comprises internal motor speed signal generator 57 using a Hall element signal to generate a commutation signal.

The operation of a manpower-assisting power apparatus according to the alternative embodiment is described next.

The two pulse streams with a 90° phase difference output from the pedal rotational speed pulse generators 51a and 51b as in the first embodiment are successively multiplied inside pedal rotational speed signal generator 52. Next, they pass through an AND gate (not shown) with direction-of-rotation detection signal $Q_4$ output from direction-of-rotation discriminator 53, the inputs of which are the two pulse streams from the pedal rotational speed pulse generators 51a and 51b, and converted to a pedal rotational speed signal. As before, this pedal rotational speed signal preferably comprises an analog voltage output developed by a frequency proportional voltage generator (not shown) within the pedal rotational speed signal generator. Pedal rotational speed signal generator 52 therefore outputs a voltage proportional to the rotational speed when pedal axle 13 rotates forward, and outputs a zero voltage when pedal axle 13 rotates backwards.

The rotational speed of electric motor 20 is voltage-converted by internal motor speed signal generator 57, input to signal comparator 55, and compared with the pedal rotational speed signal based on the command signal output from signal comparator 55. Motor speed controller 56 controls driving electric motor 20 to maintain a known ratio between the rotational speeds of the manpower rotation and electric motor rotation.

As in the first embodiment above, when motor speed controller 56 controls the ratio of the rotational speed of internal gear 45 to the rotational speed of sun gear 41 to 1:1, i.e., to suppress as much as possible rotation of planetary gears 43 around planetary gear rotation shafts 44, loss from meshing of planetary gears 43 disappears, and manpower and electric motor power are combined without mechanical loss.

For planetary gear 43 not to rotate according to this embodiment, it is necessary that the rotational speeds of internal gear 45 and sun gear 41 are equal, and the tangential force in the pitch circle of each is equal. As a result, the power ratio between the auxiliary power and manpower is equal to the tooth ratio of internal gear 45 to sun gear 41. Therefore, when compared with the first embodiment using bevel gears, a manpower-assisting power apparatus of the simplest structure and least loss can be achieved with the structure of the first embodiment when the desired combining ratio of auxiliary power and manpower is 1:1. Specifically, rotation of small bevel gears 33 can be suppressed if pedal drive bevel gear 34 and motor drive bevel gear 31 have the same number of teeth, and small bevel gear rotation shaft 32 is perpendicular to intermediate shaft 30.

In the present embodiment, however, when the desired power ratio between the auxiliary power and manpower is a ratio enabling a planetary gear mechanism to be formed by means of the gear tooth ratio of internal gear 45 and sun gear 41, i.e., when the ratio of auxiliary power to manpower is sufficiently small or sufficiently great, rotation of planetary gear 43 is suppressed, and a manpower-assisting power apparatus with the least loss can be achieved.

A separate mechanism for detecting the rotational speed of electric motor 20 is not necessary, and power assistance proportional to manpower can be achieved, by using the Hall element signal of the brushless motor as the rotational speed detection mechanism of electric motor 20 in this embodiment.

For example, when the battery is completely discharged (depleted) and power assistance is not possible, the input to the differential planetary gear mechanism is only the torque of internal gear 45 based on the applied manpower, and this torque is distributed to carrier 42 and sun gear 41 according to the load. The torque distributed to carrier 42 is consumed in rotating rear wheel axle 15, and the torque distributed to sun gear 41 also attempts to turn electric motor 20 in a conventional planetary system employing a standard DC motor. Thus, the torque distributed to gear 41 and ordinarily consumed by driving electric motor 20 is a waste of manpower.

However, the brushless motor used in this embodiment includes a rotator with a permanent magnet, and maintains a detent torque to external rotation of the motor shaft even when the motor is not driven. When this detent torque is greater than the manpower reaction force (the torque distributed to sun gear 41) occurring when the manpower-assisting power apparatus of the present embodiment is used normally, electric motor 20 does not turn. Therefore, all manpower is transferred to carrier 42, and is used effectively to drive the rear wheel.

Moreover, while the speed of the electric motor-equipped bicycle according to the present embodiment slows relative to the same pedal rotational speed by an amount equivalent to the loss of auxiliary power, the pedal load does not increase; traveling uphill, for example, therefore does not become difficult, and riders without strength, including the elderly, can ride at ease.

In addition, because the differential gear mechanism of this embodiment also has an independent axle and does not share an axle with either pedal axle 13 or rear wheel axle 15, the thickness of the mechanical assembly can be made thin, and because there is a great degree of freedom in mechanical assembly placement, a slim-line electric motor-equipped bicycle that does not interfere with the rider's body can be achieved.

The rotational speed detection mechanism of the first and second embodiments above are configured to directly detect the rotational speed of manpower rotation and electric motor rotation, but may be alternatively configured to indirectly detect at least one of these rotational speeds. For example, the rotational speed detection mechanism may be configured to detect rotational speed X of pedal drive sprocket 27 and rotational speed Z of output sprocket 35, and obtain (indirectly detect) rotational speed Y of motor drive spur gear 22 from these X and Z values based on, for example, the previously described relationship X+Y=2Z; or to detect rotational speed Y of motor drive spur gear 22 and rotational speed Z of output sprocket 35, and similarly obtain (indirectly detect) rotational speed X of pedal drive sprocket 27 from these Y and Z values. A configuration obtaining the rotational speed difference X−Y is also possible. In these cases, a rotational speed pulse generator with a sensor as previously described can be disposed, for example, opposing the side of output sprocket 35 or rear wheel sprocket 16 to detect rotational speed Z.

It is to be noted that while the present invention has been described above using an electric motor-equipped bicycle by way of example, applications for the present invention shall not be so limited, and the present invention can also be used, for example, as a manpower-assisting power apparatus for electric motor-equipped four-wheel vehicles, electric motor-equipped boats, or freight elevators for industry. In addition, another type of power transmission device such as friction transmission wheels with equivalent function can also be used for the gears.

As described hereinabove, a manpower-assisting power apparatus according to the present invention detects the rotational speed of manpower rotation and electric motor rotation easily and with high precision, compares these to obtain auxiliary power based on the manpower, and can generate auxiliary power proportional to the manpower by controlling the ratio between both rotational speeds to a constant value by means of a controller.

Furthermore, when a reverse rotation prevention mechanism preventing reverse rotation of the electric motor is provided, and when the detent torque of the electric motor is greater than the reaction force acting on the electric motor during normal use, manpower-driven operation can be easily continued even when auxiliary power is no longer obtained.

Detecting the rotational speed of the motor can also be easily accomplished when the electric motor is a brushless motor.

In addition, when the rotational speed detection mechanism comprises a sensor enabling non-contact detection of the rotational speed, the rotational speed can be detected with high precision.

When a direction-of-rotation detector for detecting the direction of manpower rotation is further provided, and particularly when operation/non-operation of the electric motor is controlled based on the detected direction of manpower rotation, control applying auxiliary power only when the manpower rotation is forward rotation is possible, and safety is high.

In this case, the construction of the apparatus can be simplified when at least some of the component parts of the direction-of-rotation detector are used in common with the rotational speed detection mechanism.

Furthermore, the differential gear mechanism can be made slimmer, the degree of freedom in placement increases, and design advantages are thus obtained, when the differential gear mechanism does not share either the primary manpower input shaft corresponding to the pedal shaft, or the final output shaft corresponding to the rear wheel, of an electric motor-equipped bicycle.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations may fall within the spirit and scope of the appended claims.

KEY TO FIGURES

10 frame
11 pedals
13 pedal axle
14 pedal axle sprocket
15 rear wheel axle
16 rear wheel sprocket
17 rear wheel one-way clutch
20 electric motor
21 motor shaft gear
22 motor drive spur gear
23 one-way motor shaft clutch
25 first chain
26 second chain
27 pedal drive sprocket
30 intermediate shaft
31 motor drive bevel gear
32 small bevel gear rotation shaft
33 small bevel gears
34 pedal drive bevel gear
35 output sprocket
41 sun gear
42 carrier
43 planetary gear
44 planetary gear rotation shaft
45 internal gear
50 motor speed pulse generator
51a, 51b pedal rotational speed pulse generators
52 pedal rotational speed signal generator
53 direction-of-rotation discriminator
54 motor rotational speed signal generator
55 signal comparator
56 motor speed controller
57 internal motor speed signal generator
60 direction-of-rotation detection circuit
61 EXOR gate
62 inverter
63 delay circuit
64 EXOR gate
65 D flip-flop
66 inverters
67, 68 D flip-flops
69 EXOR gate
71 detection bevel gear
72 spring
73 potentiometer
74 small gear
80 chain
81 pedal drive sprocket
82 pedal drive bevel gear
83 small bevel gears
84 small bevel gear rotation axle
85 output bevel gear
86 bevel gear
87 axle
88 gear

What is claimed is:

1. A manually assisted power apparatus for proportionally combining human-developed power with machine power, comprising:

a manually-driven element;

a motor;

a differential gear mechanism having a plurality of axes and including a manually-driven member coupled to said manually-driven element, a motor-driven member coupled to said motor, and an output member, each being coupled to a respective one of the plurality of axes of said differential gear mechanism;

a rotational speed detector in communication with the manually-driven and motor-driven members of said differential gear mechanism to respectively detect rotational speeds of said manually-driven and motor-driven members;

a signal comparator in communication with said rotational speed detector to compare the detected rotational speeds; and a controller in communication with said signal comparator and the motor to control the speed of the motor such that the ratio of the respective detected rotational speeds remains constant.

2. The manually assisted power apparatus of claim 1, wherein said output member further comprises:
a power output member rotatable about a central axis;
a first rotatable gear coupled to said manually-driven member and engaging said power output member at a first contact point positioned radially outwardly from the central axis;
a second rotatable gear coupled to said motor-driven member and engaging said power output member at a second contact point radially opposing said first contact point; and wherein said controller controls the speed of the motor such that relative rotation between said first and second gears is suppressed when said power output member rotates.

3. The manually assisted power apparatus of claim 1, further comprising a reverse rotation prevention mechanism in communication with said motor-driven member of said differential gear mechanism to prevent reverse rotation of the motor.

4. The manually assisted power apparatus of claim 1, wherein the rotational speed detection mechanism comprises a sensor for non-contact detection of the rotational speeds applied to said manually-driven and motor-driven members.

5. The manually assisted power apparatus of claim 1, wherein the motor comprises an electric motor.

6. The manually assisted power apparatus of claim 5, wherein the electric motor comprises a brushless DC motor.

7. A manually assisted power apparatus, comprising:

a force translation mechanism to capture human-applied force, translate the captured force into human-developed torque and apply the human-developed torque to a first drive member;

a variable speed motor to generate machine torque and apply the machine torque to a second drive member;

a gear mechanism in communication with said first and second drive members to apply the received human-developed torque and the received machine torque to drive a power output member;

a rotational speed detector in communication with said first and second drive members to determine rotational speeds of the first and second drive members;

a signal comparator in communication with said rotational speed detector to compare the detected rotational speeds of said first and second drive members; and a controller in communication with said motor and said signal comparator to control the speed of said motor such that a ratio between the detected rotational speeds of the first and second drive members remains constant.

8. The manually assisted power apparatus of claim 7, wherein said gear mechanism is a differential gear mechanism that comprises:
a first rotatable gear coupled to said first drive member and said power output member;
a second rotatable gear coupled to said second drive member and said power member; and wherein said controller controls the speed of said motor such that relative rotation of said first and second gears is suppressed.

9. The manually assisted power apparatus of claim 7, further comprising a reverse rotation prevention mechanism in communication with said second drive member and said motor to prevent reverse rotation thereof.

10. The manually assisted power apparatus of claim 7, wherein the rotational speed detection mechanism comprises a sensor for non-contact detection of the rotational speeds of said first and second drive members.

11. The manually assisted power apparatus of claim 7, wherein said motor comprises an electric motor.

12. The manually assisted power apparatus of claim 11, wherein said electric motor comprises a brushless DC motor.

* * * * *

UNITED STATES PATENT AND TRADEMARK OFFICE
CERTIFICATE OF CORRECTION

PATENT NO. : 6,125,959
DATED : October 03, 2000
INVENTOR(S) : Takeshi Seto, et al.

It is certified that an error appears in the above identified patent and that said Letters Patent is hereby corrected as shown below:

Title page, item 22, Filed, please change "July 16, 1998" to --July 15, 1998--.

Signed and Sealed this

Twenty-second Day of May, 2001

*Attest:*

NICHOLAS P. GODICI

*Attesting Officer*    Acting Director of the United States Patent and Trademark Office